United States Patent
Han (10) Patent No.: US 11,032,683 B2
(45) Date of Patent: Jun. 8, 2021

(54) METHOD AND APPARATUS FOR PUBLISHING CLOUD RESOURCE

(71) Applicant: Baidu Online Network Technology (Beijing) Co., Ltd., Beijing (CN)

(72) Inventor: Junfang Han, Beijing (CN)

(73) Assignee: Baidu Online Network Technology Co., Ltd., Beijing (CN)

(*) Notice: Subject to any disclaimer, the term of this patent is extended or adjusted under 35 U.S.C. 154(b) by 500 days.

(21) Appl. No.: 15/724,797

(22) Filed: Oct. 4, 2017

(65) Prior Publication Data

US 2018/0249280 A1 Aug. 30, 2018

(30) Foreign Application Priority Data

Feb. 28, 2017 (CN) .......................... 201710114162.1

(51) Int. Cl.
*H04W 4/60* (2018.01)
*H04L 29/08* (2006.01)

(52) U.S. Cl.
CPC .............. *H04W 4/60* (2018.02); *H04L 67/04* (2013.01); *H04L 67/2819* (2013.01); *H04L 67/1097* (2013.01); *H04L 67/20* (2013.01)

(58) Field of Classification Search
CPC ........... H04W 4/60; H04L 67/04; H04L 67/20
USPC ........................................................ 709/217
See application file for complete search history.

(56) References Cited

U.S. PATENT DOCUMENTS

| | | | |
|---|---|---|---|
| 2008/0201412 A1* | 8/2008 | Wayne | H04L 67/02 709/203 |
| 2014/0344892 A1 | 11/2014 | Liang et al. | |
| 2016/0232538 A1* | 8/2016 | Papakostas | G06F 16/48 |

OTHER PUBLICATIONS

Varenhorst, Share stuff from Dropbox in your Facebook Groups!, Sep. 26, 2012, dropbox.com (3 pages).*
Ryazanov, Meet the Dropbox Chooser, Nov. 14, 2012, dropbox.com (4 pages).*
Dropbox Chooser, Nov. 17, 2012, dropbox.com (3 pages).*
Thai, Sharing 101, May 6, 2015, dropbox.com (4 pages).*
Dropbox Chooser ("Android" tab selected), Jan. 5, 2017, dropbox.com (4 pages) (Year: 2017).*

* cited by examiner

*Primary Examiner* — Wing F Chan
*Assistant Examiner* — Leon Y Tseng
(74) *Attorney, Agent, or Firm* — von Briesen & Roper, s.c.

(57) ABSTRACT

The present application discloses a method and apparatus for publishing a cloud resource. The method includes: receiving, by a first application (APP), a usage request for a cloud resource stored in a second APP; calling, according to the usage request, an APP service page containing the cloud resource, for a user to select a to-be-used cloud resource in the APP service page; receiving address information of the to-be-used cloud resource sent by the APP service page; and publishing the to-be-used cloud resource according to the address information of the to-be-used cloud resource. By means of the technical solution of the present application, a to-be-used cloud resource can be published into a first APP rapidly and conveniently. The operation process is simple, and neither a downloading process nor an uploading process needs to be performed, thereby saving user's time and reducing consumption of traffic bandwidth to and/or from the smart phone.

20 Claims, 5 Drawing Sheets

METHOD AND APPARATUS FOR PUBLISHING CLOUD RESOURCE

CROSS-REFERENCE TO RELATED APPLICATION

This application claims the priority of Chinese Patent Application No. 201710114162.1, entitled "Method and Apparatus for Publishing Cloud Resource," filed on Feb. 28, 2017, the content of which is incorporated herein by reference in its entirety.

TECHNICAL FIELD

The present application generally relates to the field of computer technology, and in particular to a method and apparatus for publishing a cloud resource.

BACKGROUND

With the popularity and the improvement in the photographing capability of the smart phones, increasingly more resources (such as pictures and videos) are stored in smart phones. However, due to the limited storage space on the smart phones and the frequent changing of smart phones (generally within one to three years), more users choose to store the resources stored in their smart phones into personal clouds. A resource stored in a personal cloud may be referred to as a cloud resource.

Currently, some commonly used personal cloud storage services provide a function of automatically uploading a resource stored in a smart phone to a cloud in a wireless-fidelity (Wi-Fi) environment, simplifying the process of storing resources in smart phones into clouds. In addition, personal cloud storage services usually provide a cloud resource sharing function, accelerating the propagation of cloud resources.

However, the cloud resource sharing function can only be used inside a personal cloud service. Currently, if a user wants to use a cloud resource stored in a personal cloud in a first application (APP), the following process needs to be performed:

The user logs in to the personal cloud to find the cloud resource to be used, and downloads it to a location in a smart phone. After the downloading is complete, the user logs in to the first APP that needs to use the cloud resource, finds a resource-publishing entry in the first APP, selects the above-mentioned resource downloaded into the smart phone, and uploads the resource. Thus, the publishing of the resource is completed.

Although the above-mentioned process can implement the use of a cloud resource stored in a personal cloud in a first APP, the operation process is complex, and a downloading process and an uploading process are required, consuming much user's time and traffic bandwidth to and/or from the smart phone.

SUMMARY

In view of the above-mentioned defects or deficiencies in the prior art, the present application is directed to a solution for publishing a cloud resource into a first APP rapidly and conveniently.

According to a first aspect, an embodiment of the present application provides a method for publishing a cloud resource, comprising:

receiving, by a first application (APP), a usage request for a cloud resource stored in a second APP;

calling, according to the usage request, an APP service page containing the cloud resource, for a user to select a to-be-used cloud resource in the APP service page containing the cloud resource;

receiving address information of the to-be-used cloud resource sent by the APP service page; and publishing the to-be-used cloud resource according to the address information of the to-be-used cloud resource.

According to a second aspect, an embodiment of the present application further provides a method for publishing a cloud resource, comprising:

determining a to-be-used cloud resource selected by a user, when an APP service page containing a cloud resource stored in a second application (APP) is called by a first APP; and sending address information of the to-be-used cloud resource to the first APP, so that the first APP can publish the to-be-used cloud resource according to the address information.

According to a third aspect, an embodiment of the present application further provides an apparatus for publishing a cloud resource, a first application (APP) being installed on the apparatus, the apparatus comprising:

a usage request receiving unit, configured to receive a usage request for a cloud resource stored in a second APP;

a calling unit, configured to call, according to the usage request, an APP service page containing the cloud resource, for a user to select a to-be-used cloud resource in the APP service page;

an address information receiving unit, configured to receive address information of the to-be-used cloud resource sent by the APP service page; and a publishing unit, configured to publish the to-be-used cloud resource according to the address information of the to-be-used cloud resource.

According to a fourth aspect, an embodiment of the present application further provides an apparatus for publishing a cloud resource, a second application (APP) being installed on the apparatus, the apparatus comprising:

a determining unit, configured to determine a to-be-used cloud resource selected by a user, when an APP service page containing a cloud resource stored in the second APP is called by a first APP; and a sending unit, configured to send address information of the to-be-used cloud resource to the first APP, so that the first APP can publish the to-be-used cloud resource according to the address information.

According to a fifth aspect, an embodiment of the present application further provides a computer device, comprising one or more processors and a memory, wherein the memory stores instructions executable by the processor to cause the processor to execute the method for publishing a cloud resource according to the embodiments of the present application.

According to the solution for publishing a cloud resource that is provided in the embodiments of the present application, an APP service page containing a cloud resource is called, a user selects a to-be-used cloud resource in the APP service page, and the APP service page sends address information of the to-be-used cloud resource to a first APP that calls the APP service page, so that the first APP that calls the APP service page can directly publish the to-be-used cloud resource according to the received address information. By means of the technical solution of the present application, a to-be-used cloud resource can be published into a first APP rapidly and conveniently. The operation process is simple, and neither a downloading process nor an uploading process needs to be performed, thereby saving user's time and reducing consumption of traffic bandwidth to and/or from the smart phone.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
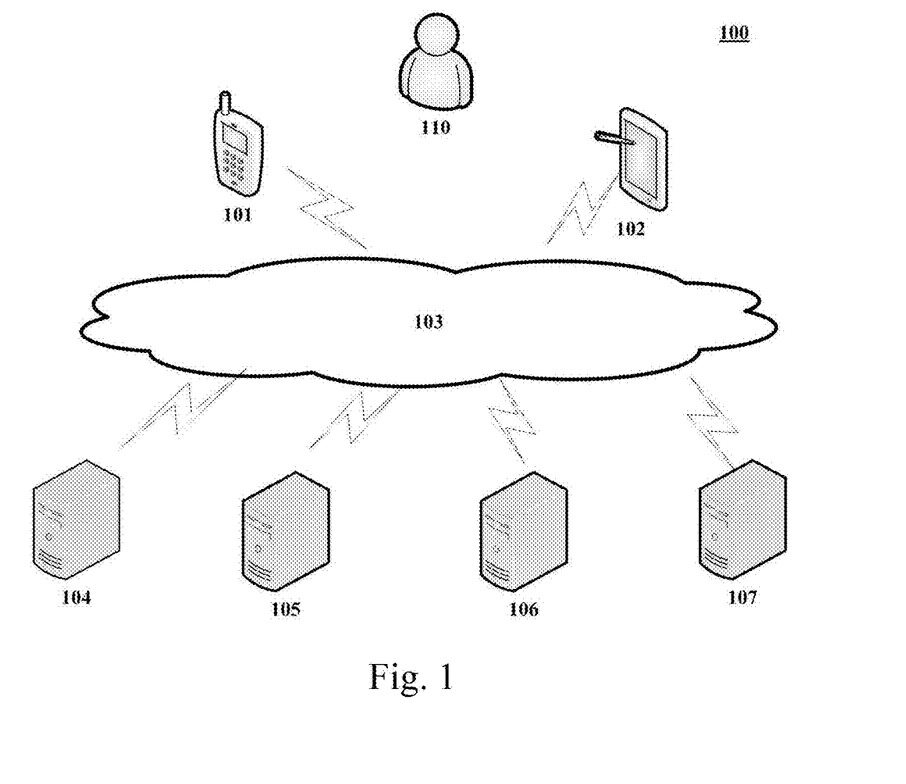
FIG. 1 shows an exemplary architecture of a system to which the present application can be applied.

FIG. 1 shows an exemplary architecture of a system 100 which may be used by embodiments of the present application.

As shown in FIG. 1, the system architecture 100 may include terminal devices 101 and 102, a network 103, and servers 104, 105, 106 and 107. The network 103 serves as a medium for providing communication links between the terminal devices 101 and 102 and the servers 104, 105, 106 and 107. The network 103 may include various types of connections, such as wired and wireless communication links or optical fiber cables.

A user 110 may use the terminal devices 101 and 102 to interact with the servers 104, 105, 106 and 107 through the network 103 to access various services, for example, to browse a web page or download data. Various client APPs such as an application capable of accessing a uniform resource locator (URL) cloud service, including but not limited to a browser, a security application and the like, may be installed on the terminal devices 101 and 102.

The terminal devices 101 and 102 may be any electronic devices, including but not limited to, a personal computer, a smart phone, a smart television, a tablet computer, a personal digital assistant, an e-book reader, and the like.

The servers 104, 105, 106 and 107 may each be a server providing various services. The server may provide a service in response to a service request from a user. It should be understood that one server may provide one or more services, and one service may be provided by multiple servers. The server involved in the embodiments of the present application may include but not limited to, a crawler scheduling server, a dynamic crawler server, a web page server, a detection server, an image recognition server, a semantic parsing server, and the like.

It should be understood that the numbers of the terminal devices, the networks and the servers in FIG. 1 are merely schematic. There may be any number of terminal devices, any number of networks and any number of servers as required in practice.

As mentioned in the Background section, in an existing solution, to publish a to-be-used cloud resource into a first APP, a user needs to download the to-be-used cloud resource to a local terminal (for example, a smart phone) and then upload it to the first APP. This process has the following deficiencies:

1. The operation process is complex, leading to high user's operation costs. Especially for an ordinary user, the process of downloading a cloud resource to a location on a smart phone and then finding the cloud resource is rather difficult to learn.

2. Much time and traffic bandwidth are consumed. A downloading process and an uploading process are required, consuming much user's time and traffic bandwidth to and/or from the smart phone.

In view of the above-mentioned deficiencies in the prior art, the embodiments of the present application provide a solution for publishing a cloud resource, where an APP service page containing a cloud resource is called, a user selects a to-be-used cloud resource in the APP service page, and the APP service page sends address information of the to-be-used cloud resource to a first APP that calls the APP service page, so that the first APP that calls the APP service page can directly publish the to-be-used cloud resource according to the received address information. By means of the technical solution of the present application, a to-be-used cloud resource can be published into a first APP rapidly and conveniently. The operation process is simple, and neither a downloading process nor an uploading process needs to be performed, thereby saving user's time and reducing consumption of traffic bandwidth to and/or from the smart phone.

The method of the embodiments of the present application is described below with reference to flow charts.

Figure 2:
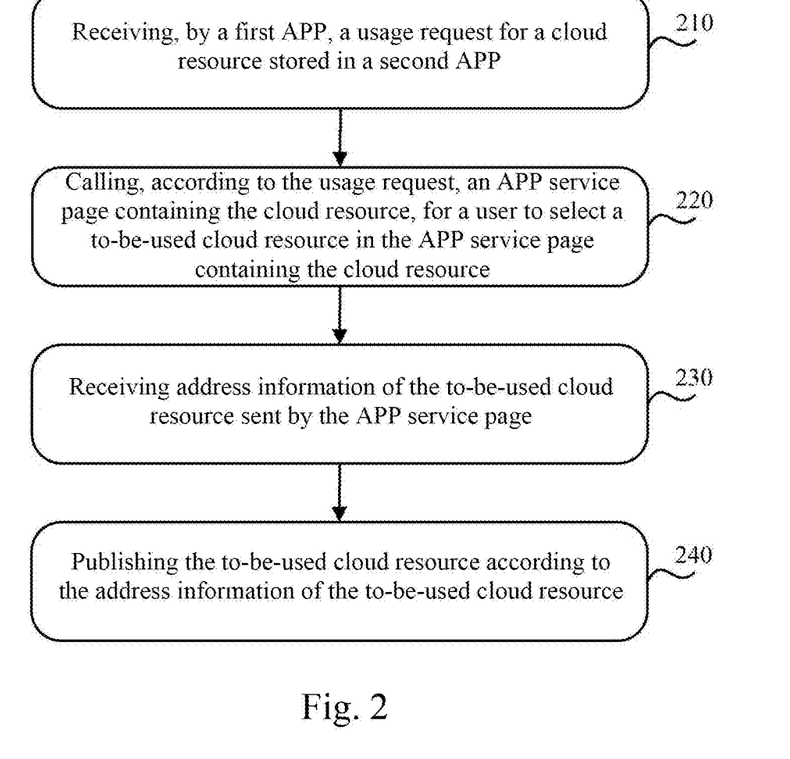
FIG. 2 is an exemplary flow chart of a method for publishing a cloud resource according to an embodiment of the present application.

Referring to FIG. 2, an exemplary flow chart of a method for publishing a cloud resource according to an embodiment of the present application is illustrated. The method shown in FIG. 2 may be executed jointly by the terminal devices and the servers in FIG. 1. The method specifically includes the following steps:

At step 210, a first APP receives a usage request for a cloud resource stored in a second APP.

The APP involved in the embodiments of the present application may be an APP installed on a mobile terminal device (such as a smart phone), or an APP installed on a non-mobile terminal device (such as a personal computer, PC).

In practical applications, step 210 may be implemented by setting a cloud resource-publishing entry in the first APP. For example, a cloud resource-publishing button is set in a publishing page of the first APP, and when a user clicks/taps the cloud resource-publishing button, a usage request for a cloud resource stored in a second APP is sent to the first APP.

At step 220, an APP service page containing the cloud resource is called according to the usage request, for a user to select a to-be-used cloud resource in the APP service page.

Specifically, the calling an APP service page containing the cloud resource in step 220 may include, but not limited to: calling, through a Software Development Kit (SDK) or a HyperText Markup Language 5 (HTML5) page, the APP service page containing the cloud resource.

In addition, when the APP service page containing the cloud resource is called, a resource type of the requested cloud resource may further be sent to the APP service page, so that the APP service page can directly display a cloud resource corresponding to the resource type.

Optionally, the resource type may include but not limited to:

one or more of a picture type, a video type, a music type, and a document type.

At step 230, address information of the to-be-used cloud resource sent by the APP service page is received.

At step 240, the to-be-used cloud resource is published according to the address information of the to-be-used cloud resource.

Optionally, the address information may be, but not limited to, URL information.

Specifically, step 240 may be, but not limited to, implemented in one of the following three manners:

First manner:

firstly, determining an address of the to-be-used cloud resource according to the address information of the to-be-used cloud resource;

then, downloading the to-be-used cloud resource from the determined address to a terminal device having the first APP, and uploading the downloaded to-be-used cloud resource on a resource server of the first APP; and finally, acquiring the to-be-used cloud resource from the resource server of the first APP, and publishing the to-be-used cloud resource.

Second manner:

firstly, determining an address of the to-be-used cloud resource according to the address information of the to-be-used cloud resource;

then, sending the address of the to-be-used cloud resource to a server of the first APP, causing the server of the first APP to download the to-be-used cloud resource from the address and store the downloaded to-be-used cloud resource on a resource server of the first APP; and finally, acquiring the to-be-used cloud resource from the resource server of the first APP, and publishing the to-be-used cloud resource.

Third manner:

firstly, determining an address of the to-be-used cloud resource according to the address information of the to-be-used cloud resource;

then, sending the determined address to a server of the first APP for storage; and finally, downloading the to-be-used cloud resource from the address stored in the server of the first APP, and publishing the to-be-used cloud resource.

In the first manner, the cloud resource presented after publishing is acquired from the resource server of the first APP, and therefore, no impact will be caused by the deletion of the original cloud resource. However, this process involves a downloading process and an uploading process, much user's time and traffic bandwidth are consumed. In the second manner, the cloud resource presented after publishing is also acquired from the resource server of the first APP, and therefore, no impact will be caused by the deletion of the original cloud resource. In addition, as this process involves only a downloading process, less user's time and traffic bandwidth are consumed. As for the third manner, the cloud resource presented after publishing is directly acquired from the address of the original cloud resource by the server of the first APP. Therefore, less user's time and traffic bandwidth are consumed, but the use of the first APP will be affected by the deletion of the original cloud resource.

Figure 3:
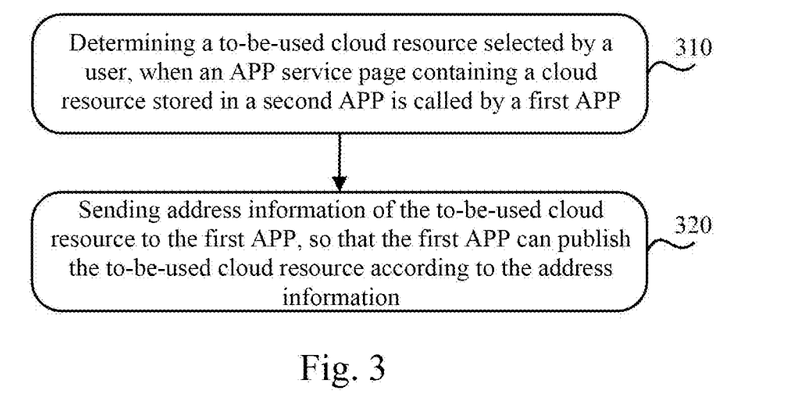
FIG. 3 is an exemplary flow chart of a method for publishing a cloud resource according to another embodiment of the present application.

Referring to FIG. 3, an exemplary flow chart of a method for publishing a cloud resource according to another embodiment of the present application is illustrated. The method shown in FIG. 3 may be executed jointly by the terminal devices and the servers in FIG. 1.

The method specifically includes the following steps:

At step 310, a to-be-used cloud resource selected by a user is determined, when an APP service page containing a cloud resource stored in a second APP is called by a first APP.

Specifically, in step 310, the to-be-used cloud resource selected by the user is determined, when the APP service page containing the cloud resource stored in the second APP is called by the first APP and the APP service page is in a current logged-in state.

If the APP service page is not in a current logged-in state, a login interface is displayed. The to-be-used cloud resource selected by the user is determined after the user logs in.

In addition, the method of this embodiment of the present application may further include:

receiving a resource type of the requested cloud resource sent by the first APP.

In this case, step 310 may specifically include, but not limited to:

displaying a cloud resource corresponding to the received resource type, when the APP service page is called by the first APP; and determining the to-be-used cloud resource that is selected by the user from the cloud resource corresponding to the resource type.

At step 320, address information of the determined to-be-used cloud resource is sent to the first APP, so that the first APP can publish the to-be-used cloud resource according to the address information.

According to the solution for publishing a cloud resource that is provided in the embodiments of the present application, an APP service page containing a cloud resource is called, a user selects a to-be-used cloud resource in the APP service page, and the APP service page sends address information of the to-be-used cloud resource to a first APP that calls the APP service page, so that the first APP that calls the APP service page can directly publish the to-be-used cloud resource according to the received address information. By means of the technical solution of the present application, a to-be-used cloud resource can be published into a first APP rapidly and conveniently. The operation process is simple, and neither a downloading process nor an uploading process needs to be performed, thereby saving user's time and traffic bandwidth to and/or from the smart phone.

It should be noted that although the operations of the method of the present application are described in a particular order in the accompanying drawings, such description shall not require or imply that the operations must be performed in the particular order or all the operations shown must be performed so as to achieve the expected result. On the contrary, the order of the steps illustrated in the flow charts may be changed.

Figure 4:
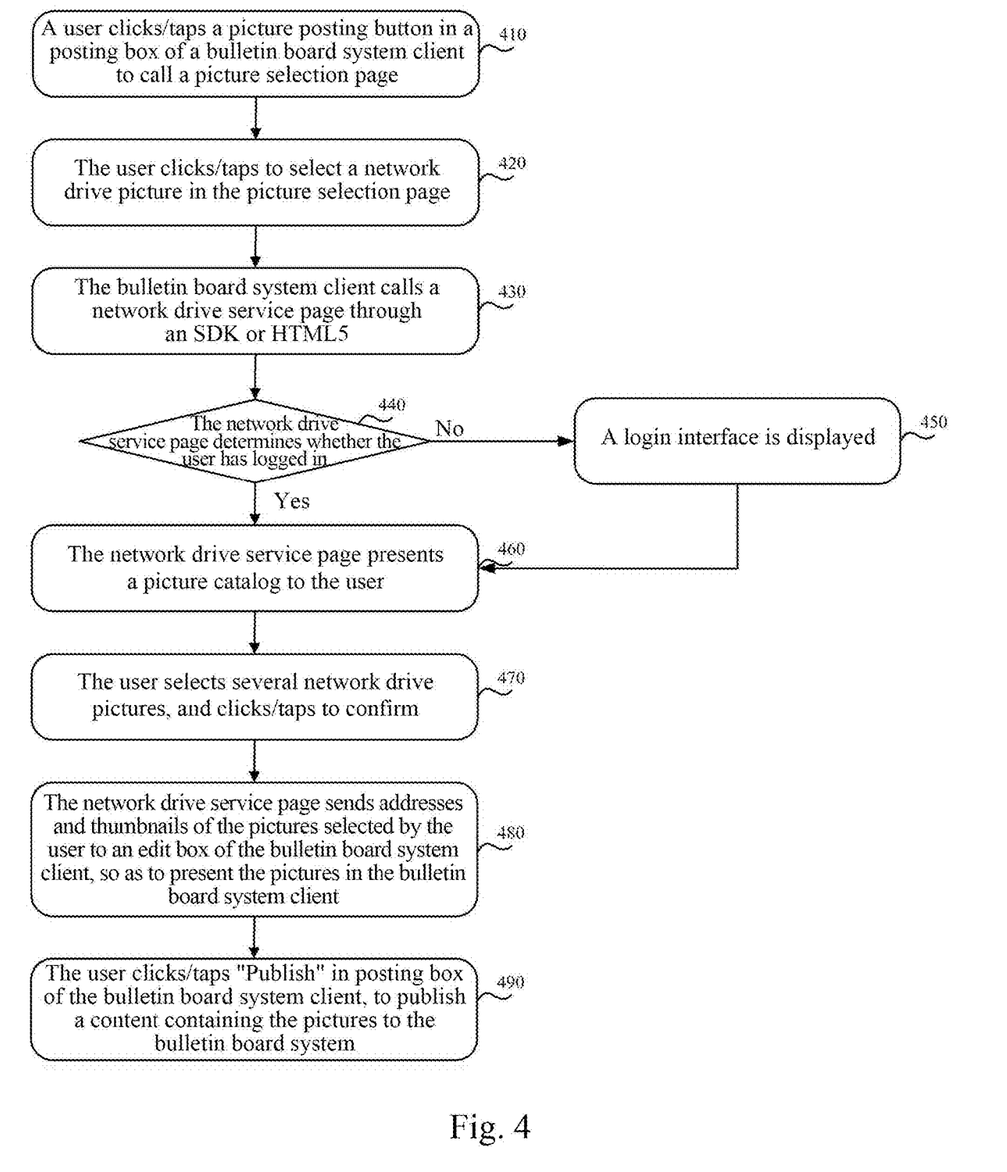
FIG. 4 is a flow chart of an implementation of publishing a picture in a network drive to a bulletin board system according to an embodiment of the present application.

The embodiments of the present application are described below by using an example where a picture in a network drive is published to a bulletin board system. The network drive and the bulletin board system are two different APPs. Referring to FIG. 4, an implementation process includes the following steps:

At step 410, a user clicks/taps a picture posting button in a posting box of a bulletin board system client to call a picture selection page.

At step 420, the user clicks/taps to select a network drive picture in the picture selection page.

In addition to a local picture option, a network drive picture option is further provided in the picture selection page.

At step 430, the bulletin board system client calls a network drive service page through an SDK or HTML5.

At step 440, the network drive service page determines whether the user has logged in. If the user has not logged in, step 450 is performed; if the user has logged in, step 460 is performed.

At step 450, a login interface is displayed. After the user logs in, step 460 is performed.

At step 460, the network drive service page presents a picture catalog to the user.

At step 470, the user selects several network drive pictures, and clicks/taps to confirm.

At step 480, the network drive service page sends addresses and thumbnails of the pictures selected by the user to an edit box of the bulletin board system client, so as to present the pictures in the bulletin board system client.

At step 490, the user clicks/taps "Publish" in the posting box of the bulletin board system client, to publish a content containing the pictures to the bulletin board system.

Step 490 may be implemented using three solutions depending on specific cases.

Solution 1: The bulletin board system client automatically downloads a picture from a network drive to a mobile phone according to an address of the picture returned by the network drive, and then uploads the picture to a bulletin board system picture server. The picture presented after publishing is acquired from the bulletin board system picture server. This solution will not be affected by the deletion of the network drive picture, but much user's time and traffic bandwidth are consumed.

Solution 2: The bulletin board system client submits an address of a picture returned by a network drive to a bulletin board system server, and the bulletin board system server fetches the related picture from the network drive and then stores the picture on a bulletin board system picture server. The picture presented after publishing is acquired from the bulletin board system picture server. This solution will not be affected by the deletion of the network drive picture, and less user's time and traffic bandwidth are consumed.

Solution 3: The bulletin board system client submits an address of a picture returned by a network drive to a bulletin board system server, and the bulletin board system server stores the address of the picture. The bulletin board system server does not fetch the picture. The picture presented after publishing is directly acquired from a network drive picture server. As for this solution, less user's time and traffic bandwidth are consumed, but the use of the first APP will be affected by the deletion of the network drive picture stored in the network drive picture server.

Figure 5:
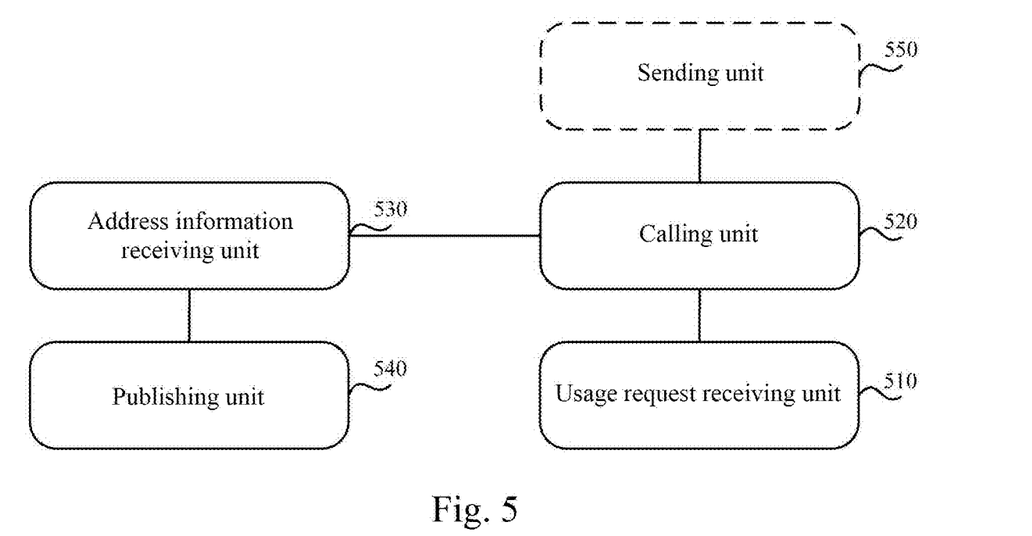
FIG. 5 is an exemplary block diagram of an apparatus for publishing a cloud resource according to an embodiment of the present application.

Further, referring to FIG. 5, an exemplary block diagram of an apparatus for publishing a cloud resource according to an embodiment of the present application is illustrated.

A first APP is installed on the apparatus. The apparatus includes:

a usage request receiving unit 510, configured to receive a usage request for a cloud resource stored in a second APP;

a calling unit 520, configured to call, according to the usage request, an APP service page containing the cloud resource, for a user to select a to-be-used cloud resource in the APP service page;

an address information receiving unit 530, configured to receive address information of the to-be-used cloud resource sent by the APP service page; and a publishing unit 540, configured to publish the to-be-used cloud resource according to the address information of the to-be-used cloud resource.

Optionally, the publishing unit 540 is configured to:

determine an address of the to-be-used cloud resource according to the address information of the to-be-used cloud resource; download the to-be-used cloud resource from the address to a terminal device having the first APP, and upload the to-be-used cloud resource to a resource server of the first APP; and acquire the to-be-used cloud resource from the resource server of the first APP, and publish the to-be-used cloud resource.

Optionally, the publishing unit 540 is configured to:

determine an address of the to-be-used cloud resource according to the address information of the to-be-used cloud resource; send the address of the to-be-used cloud resource to a server of the first APP, causing the server of the first APP to download the to-be-used cloud resource from the address and store the to-be-used cloud resource on a resource server of the first APP; and acquire the to-be-used cloud resource from the resource server of the first APP, and publish the to-be-used cloud resource.

Optionally, the publishing unit 540 is configured to:

determine an address of the to-be-used cloud resource according to the address information of the to-be-used cloud resource; send the address to a server of the first APP for storage; and download the to-be-used cloud resource from the address stored in the server of the first APP, and publish the to-be-used cloud resource.

Optionally, the calling unit 520 is configured to:

call, through a Software Development Kit (SDK) or a HyperText Markup Language 5 (HTML5) page according to the usage request, the APP service page containing the cloud resource.

Optionally, the apparatus further includes:

a sending unit 550, configured to send a resource type of the requested cloud resource to the APP service page, causing the APP service page to display a cloud resource corresponding to the resource type.

Optionally, the resource type includes:

one or more of a picture type, a video type, a music type, and a document type.

Optionally, the address information may be, but not limited to, uniform resource locator (URL) information.

It should be understood that the described subsystems and units in the apparatus correspond to the steps in the method described with reference to FIG. 2. Therefore, the operations and features described above in the method also apply to the apparatus and the units included therein, and will not be repeatedly described here.

Figure 6:
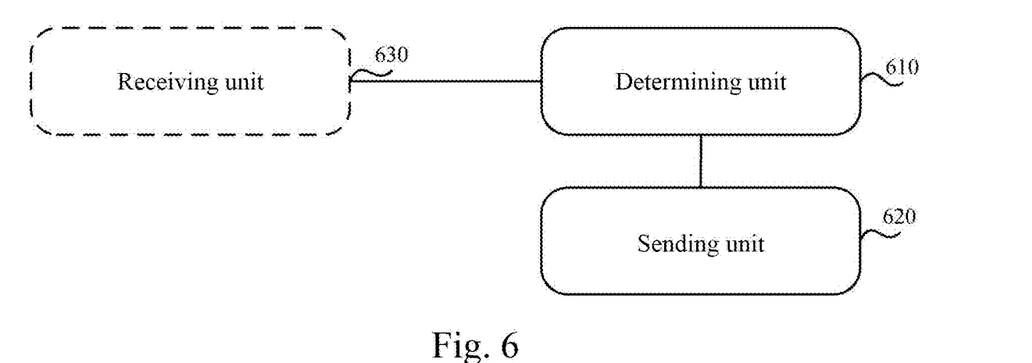
FIG. 6 is an exemplary block diagram of an apparatus for publishing a cloud resource according to another embodiment of the present application.

Further, referring to FIG. 6, an exemplary block diagram of an apparatus for publishing a cloud resource according to an embodiment of the present application is illustrated.

A second APP is installed on the apparatus. The apparatus includes:

a determining unit 610, configured to determine a to-be-used cloud resource selected by a user, when an APP service page containing a cloud resource stored in the second APP is called by a first APP; and a sending unit 620, configured to send address information of the to-be-used cloud resource to the first APP, so that the first APP can publish the to-be-used cloud resource according to the address information.

Optionally, the determining unit 610 is configured to:

determine the to-be-used cloud resource selected by the user, when the APP service page is called by the first APP and the APP service page is in a current logged-in state.

Optionally, the apparatus further includes:

a receiving unit 630, configured to receive a resource type of the requested cloud resource sent by the first APP; and the determining unit 610 is further configured to:

display a cloud resource corresponding to the resource type, when the APP service page is called by the first APP; and determine the to-be-used cloud resource that is selected by the user from the cloud resource corresponding to the resource type.

Optionally, the resource type includes:

one or more of a picture type, a video type, a music type, and a document type.

Optionally, the address information may be, but not limited to, uniform resource locator (URL) information.

It should be understood that the described subsystems and units in the apparatus correspond to the steps in the method described with reference to FIG. 3. Therefore, the operations and features described above in the method also apply to the apparatus and the units included therein, and will not be repeatedly described here.

Figure 7:
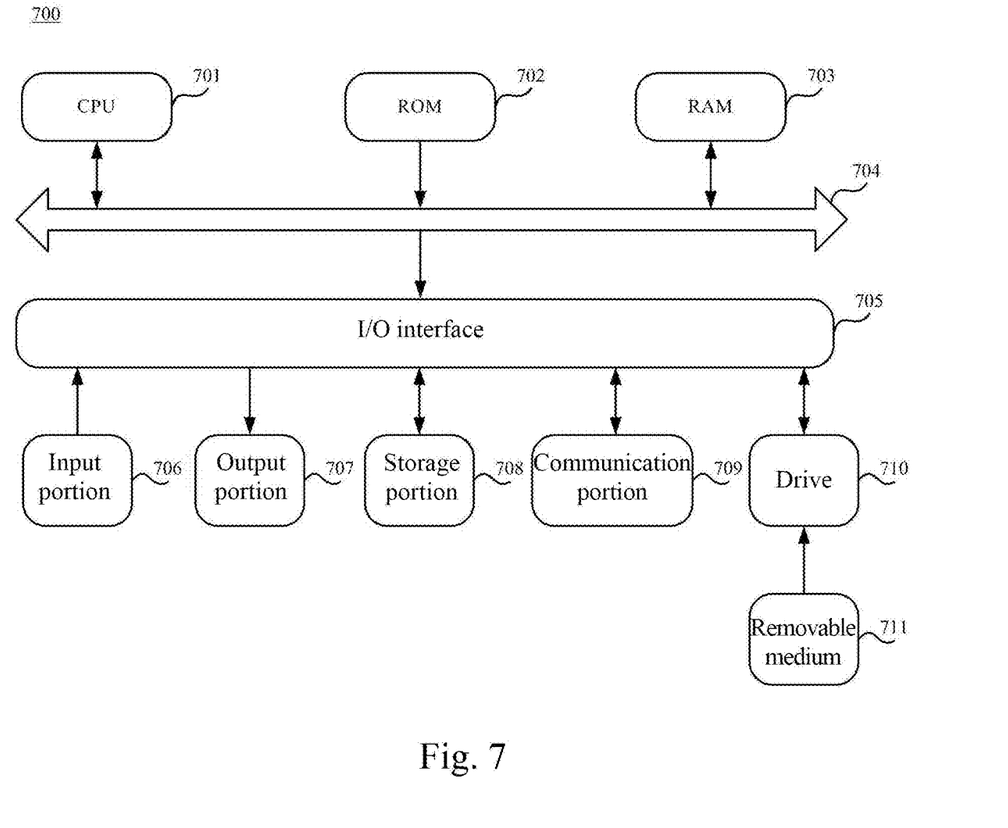
FIG. 7 is a schematic structural diagram of a computer system adapted to implement the embodiments of the present application.

Referring to FIG. 7, a schematic structural diagram of a computer system 700 adapted to implement the embodiments of the present application is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A drive 710 is also connected to the I/O interface 705 as required. A removable medium 711, such as a magnetic disk, an optical disk, a magneto-optical disk, and a semiconductor memory, may be installed on the drive 710, to facilitate the retrieval of a computer program from the removable medium 711, and the installation thereof on the storage portion 708 as needed.

In particular, according to embodiments of the present disclosure, the process described above with reference to the FIG. 2 to FIG. 4 may be implemented in a computer software program. For example, an embodiment of the present disclosure includes a computer program product, which comprises a computer program that is tangibly embedded in a machine-readable medium. The computer program comprises program codes for executing the method as illustrated in FIG. 2 to FIG. 4. In such an embodiment, the computer program may be downloaded and installed from a network via the communication portion 709, and/or may be installed from the removable media 711.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor. The names of these units or modules do not in some cases constitute a limitation to such units or modules themselves.

In another aspect, the present application further provides a non-volatile computer-readable storage medium. The non-volatile computer-readable storage medium may be the non-volatile computer storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to publish a cloud resource.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for publishing a cloud resource, comprising:
receiving, by a first application (APP), a usage request for a cloud resource stored in a second APP;
calling, according to the usage request, an APP service page containing the cloud resource, for a user to select a to-be-used cloud resource in the APP service page containing the cloud resource;
receiving address information of the to-be-used cloud resource sent by the APP service page; and
publishing the to-be-used cloud resource according to the address information of the to-be-used cloud resource;
wherein the publishing the to-be-used cloud resource according to the address information of the to-be-used cloud resource comprises: determining, by the first APP, an address of the to-be-used cloud resource according to the address information of the to-be-used cloud resource; downloading, by the first APP, the to-be-used cloud resource from the address to a terminal device, and uploading, by the first APP, the to-be-used cloud resource to a resource server of the first APP; and acquiring, by the first APP, the to-be-used cloud resource from the resource server of the first APP, and publishing the to-be-used cloud resource; or
wherein the publishing the to-be-used cloud resource according to the address information of the to-be-used cloud resource comprises: determining, by the first APP, an address of the to-be-used cloud resource according to the address information of the to-be-used cloud resource; sending, by the first APP, the address of the to-be-used cloud resource to a server of the first APP, causing the server of the first APP to download the to-be-used cloud resource from the address and store the to-be-used cloud resource on a resource server of the first APP; and acquiring, by the first APP, the to-be-used cloud resource from the resource server of the first APP, and publishing the to-be-used cloud resource; or
wherein the publishing the to-be-used cloud resource according to the address information of the to-be-used cloud resource comprises: determining, by the first APP, an address of the to-be-used cloud resource according to the address information of the to-be-used cloud resource; sending, by the first APP, the address to a server of the first APP for storage; and downloading, by the first APP, the to-be-used cloud resource from the address stored in the server of the first APP, and publishing the to-be-used cloud resource.

2. The method according to claim 1, wherein the calling, according to the usage request, an APP service page containing the cloud resource comprises:
calling, through a Software Development Kit (SDK) or a HyperText Markup Language 5 (HTML5) page according to the usage request, the APP service page containing the cloud resource.

3. The method according to claim 1, further comprising:
sending a resource type of the requested cloud resource to the APP service page, causing the APP service page to display a cloud resource corresponding to the resource type.

4. The method according to claim 3, wherein the resource type comprises:
one or more of a picture type, a video type, a music type, and a document type.

5. The method according to claim 1, wherein the address information is:
uniform resource locator (URL) information.

6. A method for publishing a cloud resource, comprising:
determining a to-be-used cloud resource selected by a user, when an application (APP) service page containing a cloud resource stored in a second application (APP) is called by a first APP; and
sending address information of the to-be-used cloud resource to the first APP, so that the first APP can publish the to-be-used cloud resource according to the address information;
wherein the first APP publishes the to-be-used cloud resource according to the address information by: determining, by the first APP, an address of the to-be-used cloud resource according to the address information of the to-be-used cloud resource; downloading, by the first APP, the to-be-used cloud resource from the address to a terminal device, and uploading, by the first APP, the to-be-used cloud resource to a resource server of the first APP; and acquiring, by the first APP, the to-be-used cloud resource from the resource server of the first APP, and publishing the to-be-used cloud resource; or
wherein the first APP publishes the to-be-used cloud resource according to the address information by: determining, by the first APP, an address of the to-be-used cloud resource according to the address information of the to-be-used cloud resource; sending, by the first APP, the address of the to-be-used cloud resource to a server of the first APP, causing the server of the first APP to download the to-be-used cloud resource from the address and store the to-be-used cloud resource on a resource server of the first APP; and acquiring, by the first APP, the to-be-used cloud resource from the resource server of the first APP, and publishing the to-be-used cloud resource; or
wherein the first APP publishes the to-be-used cloud resource according to the address information by: determining, by the first APP, an address of the to-be-used cloud resource according to the address information of the to-be-used cloud resource; sending, by the first APP, the address to a server of the first APP for storage; and downloading, by the first APP, the to-be-used cloud resource from the address stored in the server of the first APP, and publishing the to-be-used cloud resource.

7. The method according to claim 6, wherein the determining a to-be-used cloud resource selected by a user, when an APP service page containing a cloud resource stored in a second APP is called by a first APP comprises:
determining the to-be-used cloud resource selected by the user, when the APP service page is called by the first APP and the APP service page is in a current logged-in state.

8. The method according to claim 6, further comprising:
receiving a resource type of the requested cloud resource sent by the first APP; and
the determining a to-be-used cloud resource selected by a user, when an APP service page containing a cloud resource stored in a second APP is called by first APP comprises:
displaying a cloud resource corresponding to the resource type, when the APP service page is called by the first APP; and
determining the to-be-used cloud resource selected by the user from the cloud resource corresponding to the resource type.

9. The method according to claim 8, wherein the resource type comprises:
one or more of a picture type, a video type, a music type, and a document type.

10. The method according to claim 6, wherein the address information is:
uniform resource locator (URL) information.

11. An apparatus for publishing a cloud resource, comprising:
at least one processor; and
a memory storing instructions, which when executed by the at least one processor, cause the at least one processor to perform operations, the operations comprising:
receiving, by a first application (APP), a usage request for a cloud resource stored in a second APP;
calling, according to the usage request, an APP service page containing the cloud resource, for a user to select a to-be-used cloud resource in the APP service page;
receiving address information of the to-be-used cloud resource sent by the APP service page; and
publishing the to-be-used cloud resource according to the address information of the to-be-used cloud resource;
wherein the publishing the to-be-used cloud resource according to the address information of the to-be-used cloud resource comprises: determining, by the first APP, an address of the to-be-used cloud resource according to the address information of the to-be-used cloud resource; downloading, by the first APP, the to-be-used cloud resource from the address to a terminal device, and uploading, by the first APP, the to-be-used cloud resource to a resource server of the first APP; and acquiring, by the first APP, the to-be-used cloud resource from the resource server of the first APP, and publishing the to-be-used cloud resource; or
wherein the publishing the to-be-used cloud resource according to the address information of the to-be-used cloud resource comprises: determining, by the first APP, an address of the to-be-used cloud resource according to the address information of the to-be-used cloud resource; sending, by the first APP, the address of the to-be-used cloud resource to a server of the first APP, causing the server of the first APP to download the to-be-used cloud resource from the address and store the to-be-used cloud resource on a resource server of the first APP; and acquiring, by the first APP, the to-be-used cloud resource from the resource server of the first APP, and publishing the to-be-used cloud resource; or
wherein the publishing the to-be-used cloud resource according to the address information of the to-be-used cloud resource comprises: determining, by the first APP, an address of the to-be-used cloud resource according to the address information of the to-be-used cloud resource; sending, by the first APP, the address to a server of the first APP for storage; and downloading, by the first APP, the to-be-used cloud resource from the address stored in the server of the first APP, and publishing the to-be-used cloud resource.

12. The apparatus according to claim 11, wherein the calling, according to the usage request, an APP service page containing the cloud resource comprises:
calling, through a Software Development Kit (SDK) or a HyperText Markup Language 5 (HTML5) page according to the usage request, the APP service page containing the cloud resource.

13. The apparatus according to claim 11, where in the operations further comprise:
sending a resource type of the requested cloud resource to the APP service page, causing the APP service page to display a cloud resource corresponding to the resource type.

14. The apparatus according to claim 13, wherein the resource type comprises:
one or more of a picture type, a video type, a music type, and a document type.

15. The apparatus according to claim 11, wherein the address information is:
uniform resource locator (URL) information.

16. An apparatus for publishing a cloud resource, comprising:
at least one processor; and
a memory storing instructions, which when executed by the at least one processor, cause the at least one processor to perform operations, the operations comprising:
determining a to-be-used cloud resource selected by a user, when an application (APP) service page containing a cloud resource stored in a second application (APP) is called by a first APP; and
sending address information of the to-be-used cloud resource to the first APP, so that the first APP can publish the to-be-used cloud resource according to the address information;
wherein the first APP publishes the to-be-used cloud resource according to the address information by: determining, by the first APP, an address of the to-be-used cloud resource according to the address information of the to-be-used cloud resource; downloading, by the first APP, the to-be-used cloud resource from the address to a terminal device, and uploading, by the first APP, the to-be-used cloud resource to a resource server of the first APP; and acquiring, by the first APP, the to-be-used cloud resource from the resource server of the first APP, and publishing the to-be-used cloud resource; or
wherein the first APP publishes the to-be-used cloud resource according to the address information by: determining, by the first APP, an address of the to-be-used cloud resource according to the address information of the to-be-used cloud resource; sending, by the first APP, the address of the to-be-used cloud resource to a server of the first APP, causing the server of the first APP to download the to-be-used cloud resource from the address and store the to-be-used cloud resource on a resource server of the first APP; and acquiring, by the first APP, the to-be-used cloud resource from the resource server of the first APP, and publishing the to-be-used cloud resource; or
wherein the first APP publishes the to-be-used cloud resource according to the address information by: determining, by the first APP, an address of the to-be-used cloud resource according to the address information of the to-be-used cloud resource; sending, by the first APP, the address to a server of the first APP for storage; and downloading, by the first APP, the to-be-used cloud resource from the address stored in the server of the first APP, and publishing the to-be-used cloud resource.

17. The apparatus according to claim 16, wherein the determining a to-be-used cloud resource selected by a user, when an APP service page containing a cloud resource stored in a second APP is called by a first APP comprises:

determining the to-be-used cloud resource selected by the user, when the APP service page is called by the first APP and the APP service page is in a current logged-in state.

18. The apparatus according to claim 16, where in the operations further comprise:

receiving a resource type of the requested cloud resource sent by the first APP; and the determining a to-be-used cloud resource selected by a user, when an APP service page containing a cloud resource stored in a second APP is called by a first APP comprises:

displaying a cloud resource corresponding to the resource type, when the APP service page is called by the first APP; and determining the to-be-used cloud resource selected by the user from the cloud resource corresponding to the resource type.

19. The apparatus according to claim 18, wherein the resource type comprises:

one or more of a picture type, a video type, a music type, and a document type.

20. The apparatus according to claim 16, wherein the address information is:

uniform resource locator (URL) information.

* * * * *